United States Patent [19]
Furukawa

[11] Patent Number: 5,875,193
[45] Date of Patent: Feb. 23, 1999

[54] DIGITAL TRUNK FOR IN-BAND LINE SIGNAL

[75] Inventor: Nao Furukawa, Tokyo, Japan

[73] Assignee: NEC Corporation, Tokyo, Japan

[21] Appl. No.: 757,509

[22] Filed: Nov. 27, 1996

[30] Foreign Application Priority Data

Nov. 29, 1995 [JP] Japan .................................. 7-310275

[51] Int. Cl.[6] ...................................................... H04J 3/12
[52] U.S. Cl. .......................... 370/522; 370/248; 370/249; 370/458; 370/384
[58] Field of Search .................................. 370/216, 366, 370/373, 376, 381, 384, 419, 458, 463, 522, 248, 249

[56] References Cited

U.S. PATENT DOCUMENTS 4,327,436  4/1982  Ohara et al. ............................ 370/381

FOREIGN PATENT DOCUMENTS 5-95410  4/1993  Japan ................................. H04J 3/14

Primary Examiner—Dang Ton
Assistant Examiner—Shick Hom
Attorney, Agent, or Firm—Foley & Lardner

[57] ABSTRACT

A digital trunk for in-band line signals, which is capable of performing the local loopback test to verify not only the normality of the digital trunk but also the normality of the operation of upper hierarchy control devices, on-line software controlling the digital trunk and office data, is realized by only adding a small quantity of hardware of signal droppers and signal inserters. The digital trunk has a line signal sender and a line signal receiver of 32 channels and is provided with signal inserters and signal droppers for looping a speech channel at the time of the loopback test of the trunk. Furthermore, signal inserters and a multiplex circuit are provided for looping an in-band line signal. Time slots 0 and 16 which are usually unused as speech channels on the digital circuit are used as an opposed channel and a reserve channel for a loopback test, respectively, and the loopback test of the local trunk is performed.

3 Claims, 2 Drawing Sheets

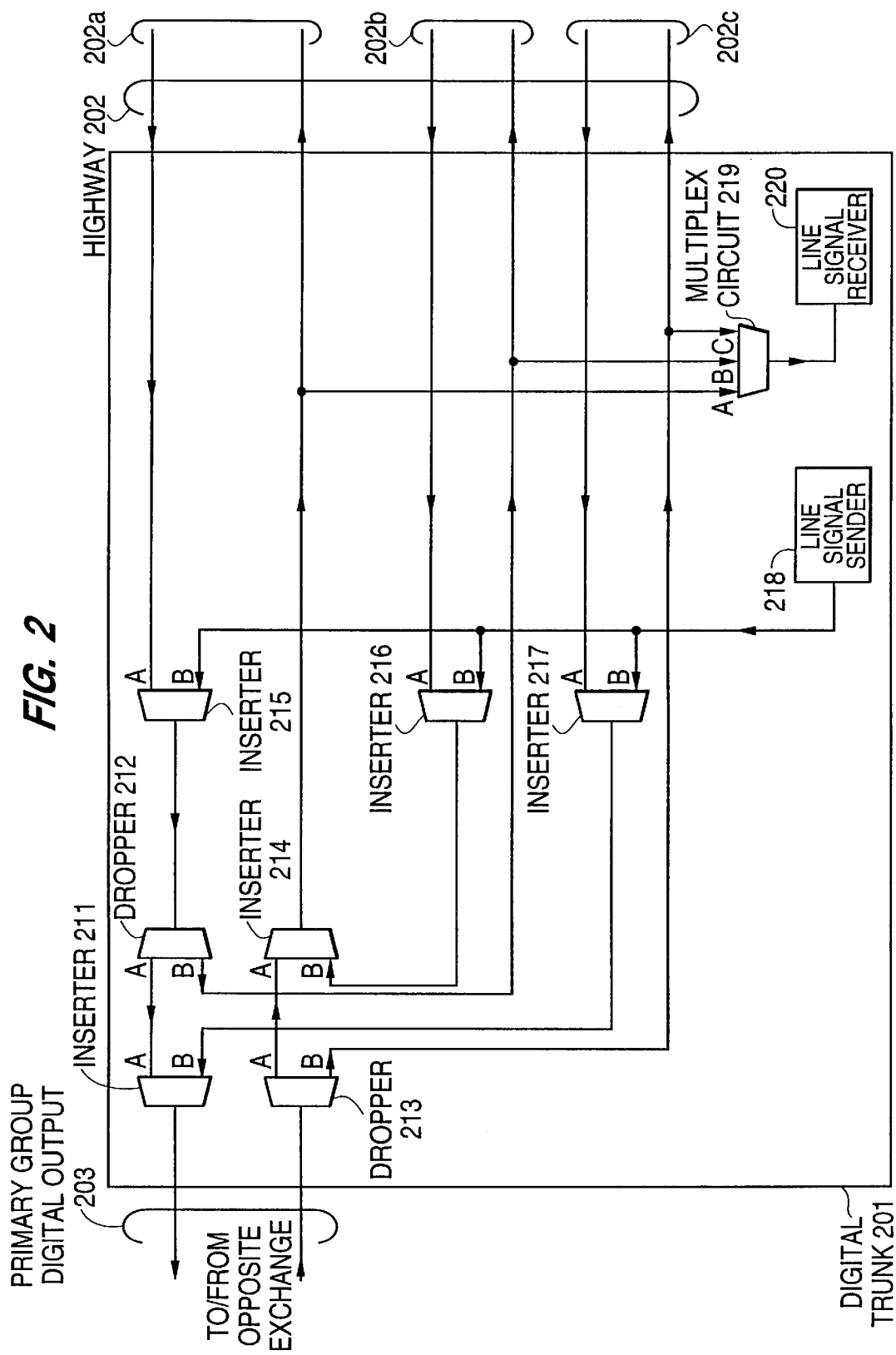

DIGITAL TRUNK FOR IN-BAND LINE SIGNAL

BACKGROUND OF THE INVENTION

1. Field of the Invention

The present invention relates to a digital trunk which is used in a digital electronic exchange to perform in-band (voice frequency band) line signal control, and more particularly, to a digital trunk including a local loopback test capability for an in-band line signal circuit by on-line call processing.

2. Description of the Related Art

Generally, digital electronic exchange, using an in-band line signaling system as one of line signaling systems, is provided with a digital trunk for controlling the in-band line signal, and the loopback test of the in-band line signal circuit is suitably to be performed to maintain normality of the in-band line signal circuit.

A technique on the loopback test of the in-band line signal circuit such as this is mentioned, for example, in Japanese Patent Application Laid-Open No. Hei 5-95410.

FIG. 1 is a block diagram showing a technology of the loopback test of the in-band line signal disclosed in the Japanese Patent Application Laid-Open No. Hei 5-95410.

The digital electronic exchange is provided with a central control 101, a time division switch 102, a multiplexer/demultiplexer 103 and a digital trunk 104, and the multiplexer/demultiplexer includes a multiplex/demultiplex circuit 131, an in-band signal transmitter 132, an in-band signal receiver 133 and a control unit 134.

In an ordinary call processing, the in-band line signal is received by the in-band signal receiver 133 through the digital trunk 104 and the multiplex/demultiplex circuit 131 which multiplexes all incoming signals. The in-band signal receiver 133 transfers the received in-band line signal to the central control 101 via the time division switch 102 for call processing purposes, and also transfers to the control unit 134 for detecting idle condition or busy condition of each time slot and classifying each signal. When the loopback test is performed, the control unit 134 detects idle time slot, and instructs the multiplex/demultiplex circuit through control line 137 to connect an incoming line 135 and an outgoing line 136 corresponding to the idle time slot having been detected. Then, the in-band signal is transmitted from the in-band signal transmitter 132 and received by the in-band signal receiver via loopback established in the multiplex/demultiplex circuit 131, and normality of the signal is confirmed.

Hitherto, in the case where the local loopback test of a digital circuit with the in-band line signal is performed in the exchange, there is another method where the transmission-reception test of the in-band line signal is performed with a transmission time slot (TS) to a circuit, as it is, returned back to the same TS on the reception side, because a line signal channel for call control and a speech channel use the same circuit, and the normality of the signal channel and speech channel is confirmed at the same time.

Furthermore, when performing the local loopback test of the digital circuit provided with in-band line signals, there is also a method where TS (not being occupied) in an idle state is detected and a transmission-reception looping test is made only for an in-band line signal which corresponds to the aforementioned TS (the transmission TS number and the reception TS number are the same).

The aforementioned loopback test, incidentally, has the following problems.

First, in the conventional loopback test, the TS on the transmission side, as it is, is simply returned to the same TS on the reception side at the time of the loopback test and transmission and reception of the signal is only confirmed. Therefore, there is the problem that the call processing sequence with the opposite exchange cannot be simulated and that the normality of a part of control hardware involved itself can only be verified but the normality of other relating parts, such as the operation of an upper hierarchy control device, on-line software and the office data, cannot be verified.

Furthermore, at the time of the loopback test, the tested circuit cannot be used for ordinary call. Therefore, it is problem that the number of circuits provided for the opposite exchange is decreased.

SUMMARY OF THE INVENTION

The object of the present invention is to provide an in-band line signal digital trunk which is capable of performing the in-band line signal test, including confirmation of the normality of the operation of the upper hierarchy control device, on-line software and office data, without reducing the number of operational circuits to the opposite exchange.

The digital trunk for in-band line signal of the present invention terminates a CEPT (European Conference of Costal and Telecommunication Administrations) type primary group digital circuit (transmission rate is 2.048 Mbit/sec, having 32 time slots, each time slot carrying 64 Kbit/sec data) using in-band line signals and is connected to the upper hierarchy control device in the exchange by the highway where 32 time slots are multiplexed.

This digital trunk is provided with a line signal sender (LSS) and a line signal receiver (LSR) of 32 channels for sending and receiving the in-band line signals on a digital circuit.

For signal channel, there are provided three signal inserters. The first signal inserter inserts, in the transmitting side of the highway, a transmission line signal for TS 1 through TS 15 and TS 17 through TS 31 among the line signals which are sent from the LSS, the second signal inserter inserts a transmission line signal for TS 0 into the TS 0 in the transmitting side of the highway, and the third signal inserter inserts a transmission line signal for TS 16 into the TS 16 in the transmitting direction of the highway. A multiplex circuit is also provided for multiplexing the data in the TS 1 through TS 15 and TS 17 through TS 31, the data in the TS 0, and the data in the TS 16 in the receiving side of the highway and giving them to the LSR.

For speech channels, there are provided two signal droppers and two signal inserters. The first signal dropper drops an arbitrary TS other than the TS 0 and the TS 16 in the transmitting side of the highway into the TS 0 in the receiving side of the highway, the fourth signal inserter inserts the TS 16 in the transmitting side of the highway into an arbitrary TS other than the TS 0 and the TS 16 in the digital circuit transmission direction, the fifth signal inserter inserts the TS 0 in the transmitting side of the highway into an arbitrary TS other than the TS 0 and the TS 16 in the receiving side of the highway, and second signal dropper drops an arbitrary TS other than the TS 0 and the TS 16 in the digital circuit receiving side into the TS 16 in the receiving side of the highway.

The CEPT type primary group digital circuit is constituted by one frame of 32 time slots (TS 0 through TS 31). The TS 0 and the TS 16 on the highway corresponding to the TS 0 and the TS 16 on the CEPT type primary group digital circuit are normally unused. In the present invention, the unused TS 0 and TS 16 are used for the loopback test of the trunk.

Specifically, if a channel to be tested is taken to be TS No. n, TS 0 is used as a local loopback opposed channel instead of the TS No. n at the time of the local loopback test of the trunk. With this, the TS No. n on the digital circuit is held in an operational state during the loopback test. For this reason, TS 16 is used as a reserve channel that is opposed to an opposed station.

Furthermore, the line signal sender and the line signal receiver are in-band signal sender and receiver sections of 32 channels, respectively. At the time of the loopback test, the line signal sender/receiver channel for TS 0 and the line signal sender/receiver channel for TS n are looped and opposed, and furthermore, the line signal sender/receiver channel for TS 16 is used as an opposed channel that is opposed to an opposed exchange side.

The operation of inserting, separating, and multiplexing a speech channel and an in-band line signal at the time of a loopback test is performed by inserters, droppers, and a multiplex circuit.

BRIEF DESCRIPTION OF THE DRAWINGS

FIG. 2 is a block diagram showing one embodiment of a digital trunk for an in-band line signal according to the present invention.

DETAILED DESCRIPTION OF THE PREFERRED EMBODIMENTS

Figure 1:
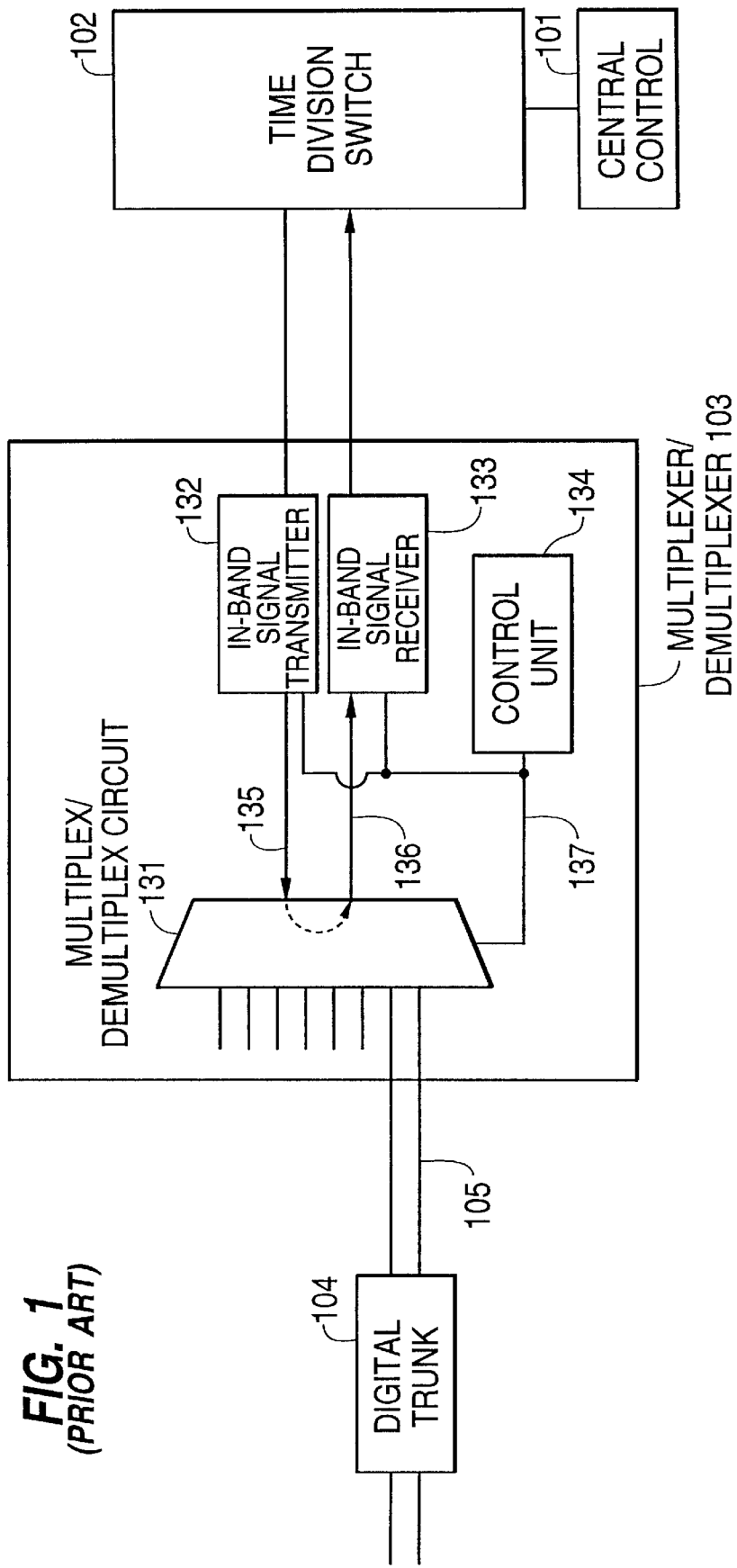
FIG. 1 is a block diagram showing one example of conventional technology of the loopback test of the in-band line signal.

The present invention will hereinafter be described in reference to the drawing. FIG. 2 is a block diagram showing an example of a digital trunk for the in-band line signal of the present invention.

Referring to FIG. 2, a digital trunk 201 shown is employed, for example, in a digital electronic exchange (not shown) and performs in-band line signal control.

The digital trunk 201 terminates a CEPT (European conference of postal and telecommunication administrations) type, as an example, primary group (transmission rate is 2.048 Mbit/sec, having 32 time slots, each time slot carrying 64 Kbit/sec data) digital circuit 203 as a line-side interface, and furthermore, the digital trunk 201 is connected to a highway 202 as an interface of the upper hierarchy control devices such as multiplex/demultiplex circuit, time division switch and central control, etc., (not shown). Note that control links for the call processing control between the digital trunk and the upper hierarchy control devices are also multiplexed in the highway 202, however, the illustration is omitted and speech channels only are illustrated. Also, TS 1 (time slot) through TS 15 and TS 17 through TS 31 are given as speech channel 202a, TS 0 as signal channel (to be used as speech channel in the present invention) 202b, and TS 16 as signal channel (to be used as speech channel in the present invention) 202c for convenience of explanation, but practically these time slots are all time-division multiplexed on the highway 202.

The digital trunk 201 is provided with a line signal sender 218 for transmitting the in-band line signal, a line signal receiver 220 for receiving the in-band line signal, signal inserters 211, 214, 215, 216 and 217 to insert a signal into a particular time slot, signal droppers 212 and 213 for dropping a signal from a particular time slot and multiplex circuit 219 for multiplexing signals on the highway 202a, 202b and 202c and outputs the multiplexed signal to the line signal receiver 220.

First, a description will be made of the normal flow of signals for call control procedures. Assume here that the illustrated digital trunk 201 is an outgoing trunk (hereinafter referred to as OGT) in this exchange and that a trunk on the opposite exchange (not shown) connected with the primary group digital circuit 203 is an incoming trunk (hereinafter referred to as ICT).

Now, when the upper hierarchy control device, such as central control, of the exchange selects a communication channel and instructs that TS No. n (where n is any one between 1 to 15 and 17 to 31) is to be used for the communication channel, the line signal sender (LSS) 218 outputs a start signal from a channel corresponding to TS-n, and the start signal is inserted into the TS-n on the highway 202 at the B input of the inserter 215. Then, the start signal is transmitted to the TS-n on the digital circuit 203 via the A output of the dropper 212 and the A input of the inserter 211.

On the other hand, from the ICT of the opposite exchange, a confirmation signal with respect to the start signal is returned by using the TS-n on the digital line 203, and the signal is received with a TS-n channel at the line signal transceiver (LSR) 220 via the A output of the dropper 213, the A input of the inserter 214, and the A input of the multiplex circuit 219.

Thereafter, when inter-office call connecting procedures have been completed in the same signaling route, the input of the inserter 215 is switched to the A input and the inter-office speech channel path is established on the highway 202 (Note that a description of the call releasing procedures in this embodiment is omitted).

A description will next be made of the local loopback test procedures of the OGT channel of the TS No. n.

When the local loopback test designating the TS-n is activated, the TS-n and the TS-0, which is usually used as signal path and not used as speech path, are selected as the test paths. In the LSS 218, a start signal is sent from the TS-n channel, and in the LSR 220 the start signal is received with the TS-0 channel by way of the B input of the inserter 215, the B output of the dropper 212 (TS N–TS 0), and the B input of the multiplex circuit 219.

On the other hand, in the LSS 218, a start confirmation signal is sent from the TS-0 channel, and in the LSR 220 the start confirmation signal is received with the TS-n channel by way of the B input of an inserter 216, the B input of the inserter 214 (TS 0–TS N), and the A input of the multiplex circuit 219.

Thereafter, when, in the same route, signaling procedures for call connection are completed between the OGT channel of the TS-n which is a channel to be tested and the TS-0 which is assumed as the opposite ICT, the inserters 215 and 216 both switch the input to the A input and a speech channel path is established between TS-n and the TS-0 on the highway 202 (Note that a description of the call releasing procedures in this embodiment is omitted).

In order to make efficient use of the TS-n on the digital circuit 203 during the aforementioned test of the OGT channel of the TS-n, the TS 16, which is usually used as signal channel and not used as speech channel, is used as a substitute of the OGT channel of the TS-n (that is, as a reserve channel).

When the ordinary call connection is needed by using TS-16 instead of the TS-n currently being used as loopback test, in the LSS 218, a start signal is sent from the TS-16 channel, and the start signal is sent to the TS-n on the digital circuit 203 by way of the B input of an inserter 217 and the B input of the inserter 211 (TS 16–TS N).

A start confirmation signal from the opposite exchange is received with the TS-16 channel at the LSR 220 by way of the TS-n on the digital circuit 203, the B output of the dropper 213 (TS N–TS 16), and the C input of the multiplex circuit 219.

Thereafter, when signaling procedures for call connection has been completed, in the same route, between the OGT channel of the TS-16 which is a reserve channel and the ICT channel of the TS-n of the opposite exchange, the input of the inserter 217 is switched to the A input and an inter-office speech channel path is established on the highway 202 (Note that a description of the call releasing procedure in this embodiment is omitted).

As has been described, the present invention has the advantageous effect that not only the normality of the digital trunk but also the normality of the operation of upper hierarchy control devices and on-line software controlling the digital trunk and furthermore the normality of office data can be systematically verified by only the addition of a small quantity of hardware where droppers and inserters are added to signal channels and speech channels.

That is, in the present invention the TS-0, which is usually unused as a speech channel on the digital circuit, is used in the exchange as an loopback opposed channel for a local loopback test, and the channels corresponding to the TSs-0 of the LSS and the LSR which have hitherto been unused are effectively utilized.

Furthermore, in the present invention the TS-16, which is usually unused as a speech channel on the digital circuit, is used in the exchange as a reserve channel that is opposed to the opposite exchange at the time of a loopback test, and the channels corresponding to the TS-16 of the LSS and the LSR which have hitherto been unused are effectively utilized. Therefore, there is the advantageous effect that the call processing service between the test channel and the opposite exchange can be continuously operated without being interrupted even during the loopback test of the trunk.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A digital trunk employed in a digital electronic exchange interfaced with upper hierarchy devices of the digital electronic exchange through a highway multiplexing a plurality of time slots as communication channels and terminates a digital circuit connected to an opposite exchange, the digital trunk comprising:

a line signal sender for outputting in-band line signals to each of communication channels on a transmitting side of the highway;

a line signal receiver for receiving said in-band line signals from each of communication channels on a receiving side of the highway;

a first signal inserter, its first input being connected to the transmitting side of the highway carrying predetermined number of time slots, its second input being connected to the line signal sender, for inserting said in-band line signals output from the line signal sender to a time slot to be specified;

a second signal inserter, its first input being connected to the transmitting side of the highway carrying a first specific time slot, its second input being connected to the line signal sender, for inserting said in-band line signals output from the line signal sender to the first specific time slot;

a third signal inserter, its first input being connected to the transmitting side of the highway carrying a second specific time slot, its second input being connected to the line signal sender, for inserting said in-band line signals output from the line signal sender to the second specific time slot;

a first signal dropper, its input being connected to output of the first signal inserter, and having first output and second output, for dropping in-band signals on the time slot being specified onto the first specific time slot on the receiving side of the highway through the second output;

a fourth signal inserter, its first input being connected to the first output of the first signal dropper, its second input being connected to output of the third signal inserter, and its output being connected to the digital circuit, for inserting in-band line signals output from the third signal inserter to the time slot to be specified, and outputting to the digital circuit;

a second signal dropper, its input being connected to the digital circuit, and having first output and second output, for dropping in-band signals coming from the digital circuit on the time slot being specified onto the second specific time slot on the receiving side of the highway through the second output;

a fifth signal inserter, its first input being connected to the first output of the second signal dropper, its second input being connected to output of the second signal inserter, for inserting said in-band line signals output from the second signal inserter to the time slot to be specified on the receiving side of the highway; and a multiplex circuit being connected to the receiving side of the highway for multiplexing said in-band line signals on the highway to give them to the line signal receiver.

2. The digital trunk as set forth in claim 1, wherein the digital circuit is an European Conference of Postal and Telecommunications Administrations CEPT type primary group digital circuit, the first specific time slot is time slot number 0 and the second specific time slot is time slot number 16.

3. The digital trunk as set forth in claim 1, wherein the first specific time slot and the second specific time slot are usually not being used as speech channel.

* * * * *